(12) United States Patent
Aso (10) Patent No.: US 11,745,276 B2
(45) Date of Patent: Sep. 5, 2023

(54) CUTTING INSERT AND CUTTING TOOL

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/589,352

(22) Filed: Jan. 31, 2022

(65) Prior Publication Data

US 2022/0258258 A1 Aug. 18, 2022

(30) Foreign Application Priority Data

Feb. 18, 2021 (JP) .................................. 2021-023878

(51) Int. Cl.
*B23B 5/22* (2006.01)
*B23B 5/10* (2006.01)
(Continued)

(52) U.S. Cl.
CPC .............. *B23C 5/2213* (2013.01); *B23C 5/20* (2013.01); *B23C 2200/0477* (2013.01);
(Continued)

(58) Field of Classification Search
CPC .............. B23C 5/2213; B23C 2200/12; B23C 2200/126; B23C 2200/208; B23C 5/202;
(Continued)

(56) References Cited

U.S. PATENT DOCUMENTS 5,454,670 A * 10/1995 Noda ..................... B23C 5/2278
407/42
7,118,312 B2 * 10/2006 Norstrom .............. B23B 27/145
407/113
(Continued)

FOREIGN PATENT DOCUMENTS

EP 3 338 929 A1 6/2018
EP 3 338 931 A1 6/2018
(Continued)

*Primary Examiner* — Sara Addisu
(74) *Attorney, Agent, or Firm* — Studebaker & Brackett PC (57) ABSTRACT

Provided is a cutting insert configured to be able to realize downsizing of a cutting tool. A cutting insert includes: an upper surface and a lower surface facing each other and having a plurality of corner parts; a side surface connecting the upper surface and the lower surface and forming intersecting edges with the upper surface and the lower surface, respectively; and a through hole that has a central axis extending from the upper surface to the lower surface and that is formed for penetration from the upper surface to the lower surface. A corner cutting edge arranged at a position corresponding to a corner part of the upper surface, a minor cutting edge connected to a first end of the corner cutting edge, and a major cutting edge connected to a second end of the corner cutting edge are formed on the intersecting edge between the upper surface and the side surface. A flank of the corner cutting edge and a recessed part located on the lower surface side of the flank of the corner cutting edge are formed on the side surface.

10 Claims, 11 Drawing Sheets

(51) Int. Cl.
*B23B 5/20* (2006.01)
*B23C 5/22* (2006.01)
*B23C 5/20* (2006.01)

(52) U.S. Cl.
CPC .... *B23C 2200/12* (2013.01); *B23C 2200/125* (2013.01); *B23C 2200/201* (2013.01); *B23C 2210/168* (2013.01)

(58) Field of Classification Search
CPC ..... B23C 5/06; B23C 2200/0477; B23C 5/02; B23C 2200/04; B23C 5/109; B23C 2200/0483; B23C 2200/123; B23C 2200/125; B23C 5/00; B23C 2200/203; B23C 2200/201; B23C 2200/0411
See application file for complete search history.

(56) References Cited

U.S. PATENT DOCUMENTS

| | | | |
|---|---|---|---|
| 7,905,688 B2 * | 3/2011 | Ertl | B23C 5/10 407/53 |
| 9,475,135 B2 * | 10/2016 | Wandeback | B23F 21/166 |
| 10,343,226 B2 * | 7/2019 | Yoshida | B23C 5/202 |
| 11,285,550 B2 * | 3/2022 | Tabe | B23C 5/109 |
| 2005/0254908 A1 | 11/2005 | Norstrom et al. | |
| 2010/0266353 A1 * | 10/2010 | Zitzlaff | B23B 27/145 407/113 |
| 2015/0202697 A1 | 7/2015 | Shiota et al. | |
| 2019/0054550 A1 * | 2/2019 | Yoshida | B23B 27/14 |
| 2019/0160557 A1 | 5/2019 | Hecht et al. | |
| 2019/0283151 A1 * | 9/2019 | Jansson | B23C 5/2213 |
| 2021/0252615 A1 * | 8/2021 | Kister | B23C 5/202 |

FOREIGN PATENT DOCUMENTS

| | | |
|---|---|---|
| EP | 3 702 079 A1 | 9/2020 |
| JP | H02-135101 U | 11/1990 |
| JP | 5773085 B2 | 9/2015 |
| JP | 2021-504157 A | 2/2021 |
| WO | 2004/002664 A2 | 1/2004 |
| WO | 2014/050438 A1 | 4/2014 |
| WO | 2015/002310 A1 | 1/2015 |

\* cited by examiner

CUTTING INSERT AND CUTTING TOOL

BACKGROUND

Field

The present invention relates to a cutting insert and a cutting tool.

Description of Related Art

A cutting tool having a cutting insert is used in a milling process of, for instance, shoulder-milling a square part of a work material.

The cutting tool described above includes a columnar tool body and a plurality of cutting inserts fixed to a leading end of the body on the same circumference around a rotational axis of the body. The cutting tool is capable of shaving a work material by causing the tool body to rotate about the rotational axis and the plurality of cutting inserts to come into contact with the work material while rotating (see Japanese Patent No. 5773085).

SUMMARY

Incidentally, in a cutting process using the cutting tool described above, it is desired to downsize the cutting tool in order to cut smaller and finer parts. Unfortunately, in the foregoing cutting tool, making the tool body thinner (reducing the diameter thereof), for example, causes the plurality of cutting inserts to interfere with each other, making it impossible to mount the plurality of cutting inserts. Therefore, the cutting tool cannot be downsized.

The present invention has been made in view of the foregoing, and an object of the present invention is to provide a cutting insert configured to be able to realize downsizing of a cutting tool, and the cutting tool.

A cutting insert according to one aspect of the present invention includes: an upper surface and a lower surface facing each other and having a plurality of corner parts; a side surface connecting the upper surface and the lower surface and forming intersecting edges with the upper surface and the lower surface, respectively; and a through hole that has a central axis extending from the upper surface to the lower surface and that is formed for penetration from the upper surface to the lower surface, wherein a corner cutting edge arranged at a position corresponding to a corner part of the upper surface, a minor cutting edge connected to a first end of the corner cutting edge, and a major cutting edge connected to a second end of the corner cutting edge are formed on the intersecting edge between the upper surface and the side surface, and a flank of the corner cutting edge and a recessed part located on the lower surface side of the flank of the corner cutting edge are formed on the side surface.

According to the foregoing aspect, a plurality of the cutting inserts can be fixed to a tool body, with the cutting inserts being arranged closer to each other without interfering with each other. Thus, a tool diameter can be reduced, and thereby a cutting tool can be downsized.

In the foregoing aspect, a flank of the minor cutting edge may be formed on the side surface, and the recessed part may be formed so as to extend to a position on the lower surface side of the flank of the minor cutting edge.

In the foregoing aspect, an outer rim of the recessed part may include a lower rim intersecting edge between the lower surface and the side surface. The lower rim intersecting edge of the recessed part may recede toward the central axis side of the through hole from a first extended projection line obtained by stretching the flank of the corner cutting edge toward the lower surface side along the flank and projecting the flank on the same plane as the lower surface.

In the foregoing aspect, a flank of the major cutting edge may be formed on the side surface, a first intersecting edge that is between the side surface and the lower surface and that is located on the lower surface side of the major cutting edge may recede toward the central axis side of the through hole from a second extended projection line obtained by stretching the flank of the major cutting edge toward the lower surface side along the flank and projecting the flank on the same plane as the lower surface, and a maximum receding quantity of the lower rim intersecting edge of the recessed part from the first extended projection line may be greater than a maximum receding quantity of the first intersecting edge from the second extended projection line.

In the foregoing aspect, in a bottom view, a first internal angle that is formed by a virtual extension line obtained by stretching the lower rim intersecting edge of the recessed part toward the major cutting edge side and a virtual line on the major cutting edge may be greater than a second internal angle that is formed by a virtual extension line obtained stretching the minor cutting edge toward the corner cutting edge side and a virtual extension line obtained by stretching the major cutting edge toward the corner cutting edge side.

In the foregoing aspect, in the bottom view, a first end and a second end of the lower rim intersecting edge of the recessed part may be positioned so as to oppose each other with a virtual line therebetween, the virtual line passing through a peak of the corner cutting edge and the central axis of the through hole.

In the foregoing aspect, the outer rim of the recessed part may include a top rim part formed at a lower end of the flank of the corner cutting edge, a first lateral rim part connected from the top rim part to the first end of the lower rim intersecting edge, and a second lateral rim part connected from the top rim part to the second end of the lower rim intersecting edge.

In the foregoing aspect, the recessed part may have a curved shape that is recessed toward the central axis side of the through hole.

In the foregoing aspect, in a top view, a size twice a maximum dimension of the cutting insert may be greater than a tool diameter of the tool body of the cutting tool to which the cutting insert is fixed.

A cutting tool according to another aspect of the present invention includes the cutting insert and a tool body to which the cutting insert is fixed.

DETAILED DESCRIPTION

A preferred embodiment of the present invention is now described hereinafter with reference to the drawings.

Figure 1:
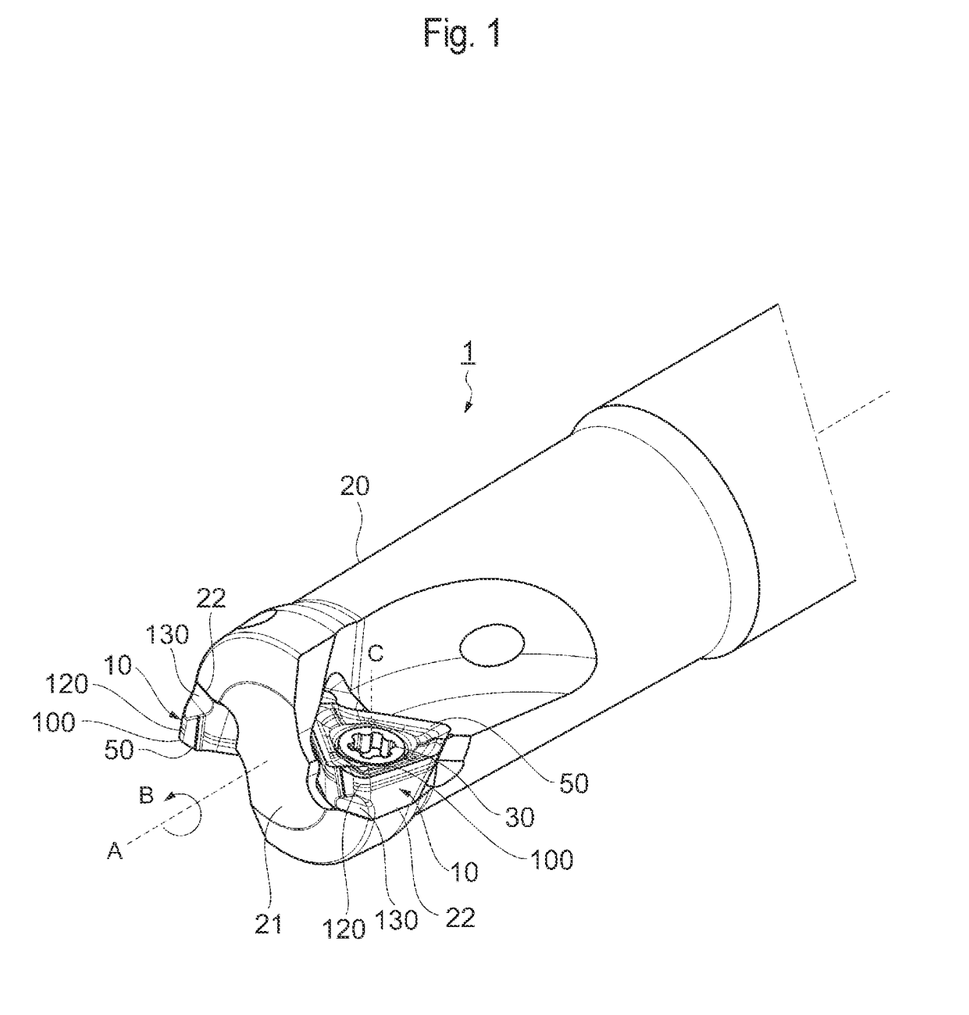
FIG. 1 is a perspective view of a cutting tool.
Figure 2:
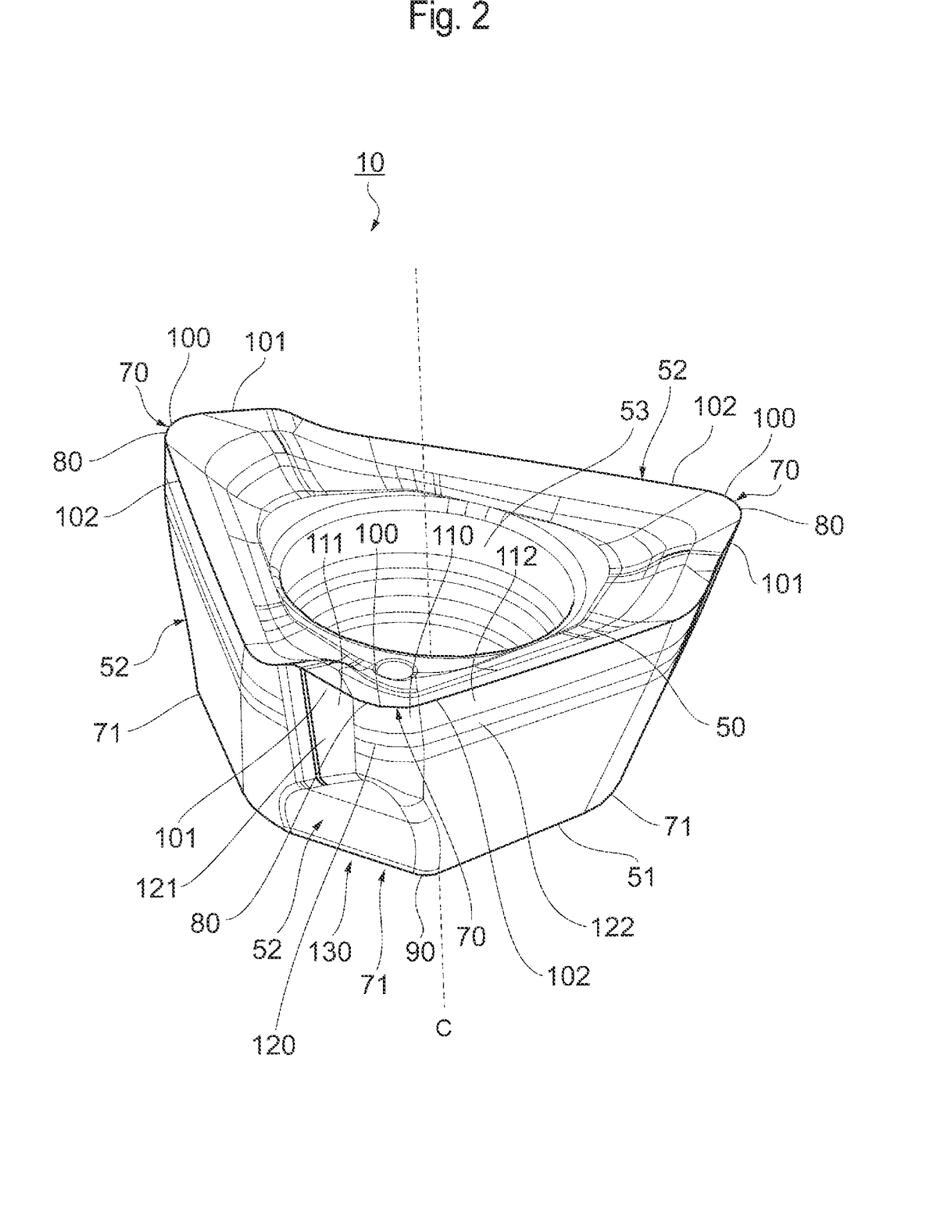
FIG. 2 is a perspective view of a cutting insert.

FIG. 1 is an explanatory diagram schematically showing a cutting tool 1 according to the present embodiment. FIG. 2 is a perspective view of a cutting insert 10. Note, in the present specification, that "upper/top" and "lower/bottom" are based on the posture of the cutting insert 10 shown in FIG. 2.

The cutting tool 1 illustrated in FIG. 1 is an indexable milling tool. The cutting tool 1 is not particularly limited, but is, for example, a tool for use in small-diameter shoulder milling. The cutting tool 1 includes a plurality of cutting inserts 10 and a tool body 20 to which the cutting inserts 10 are fixed. The tool body 20 is formed in, for example, a columnar shape, wherein a central axis thereof is a rotational axis A. The tool body 20 includes a leading end end surface 21 that is flat and perpendicular to the rotational axis A. The tool body 20 includes a plurality of fixing parts 22 around the leading end end surface 21, to which the respective cutting inserts 10 are fixed by means of screws 30. The fixing parts 22 are provided at a plurality of locations, such as two locations, centering around the rotational axis A at equal intervals. The cutting inserts 10 can be fixed to the respective fixing parts 22 in such a manner that upper surfaces 50 of the cutting inserts 10 face a rotating direction B.

Figure 3:
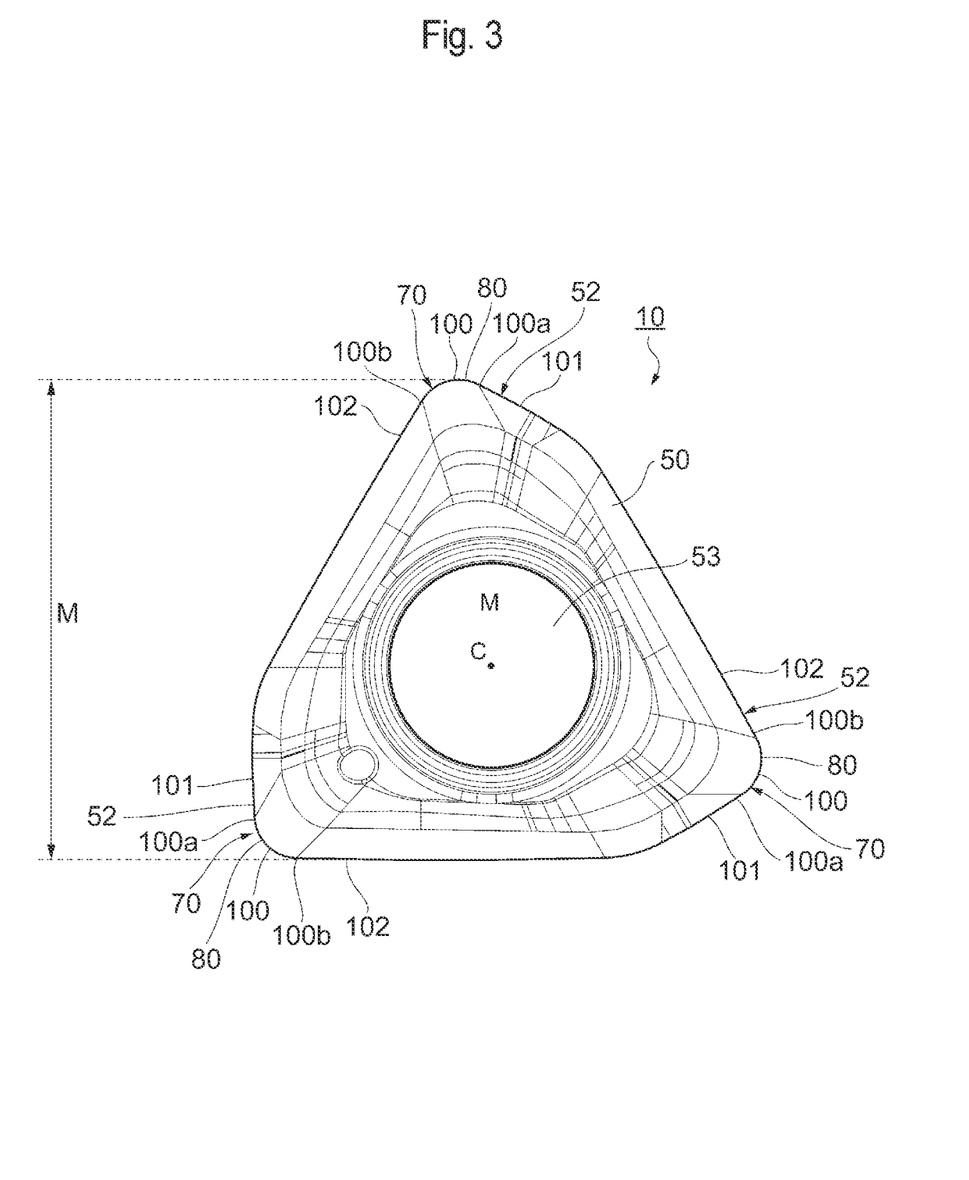
FIG. 3 is a top view of the cutting insert.
Figure 4:
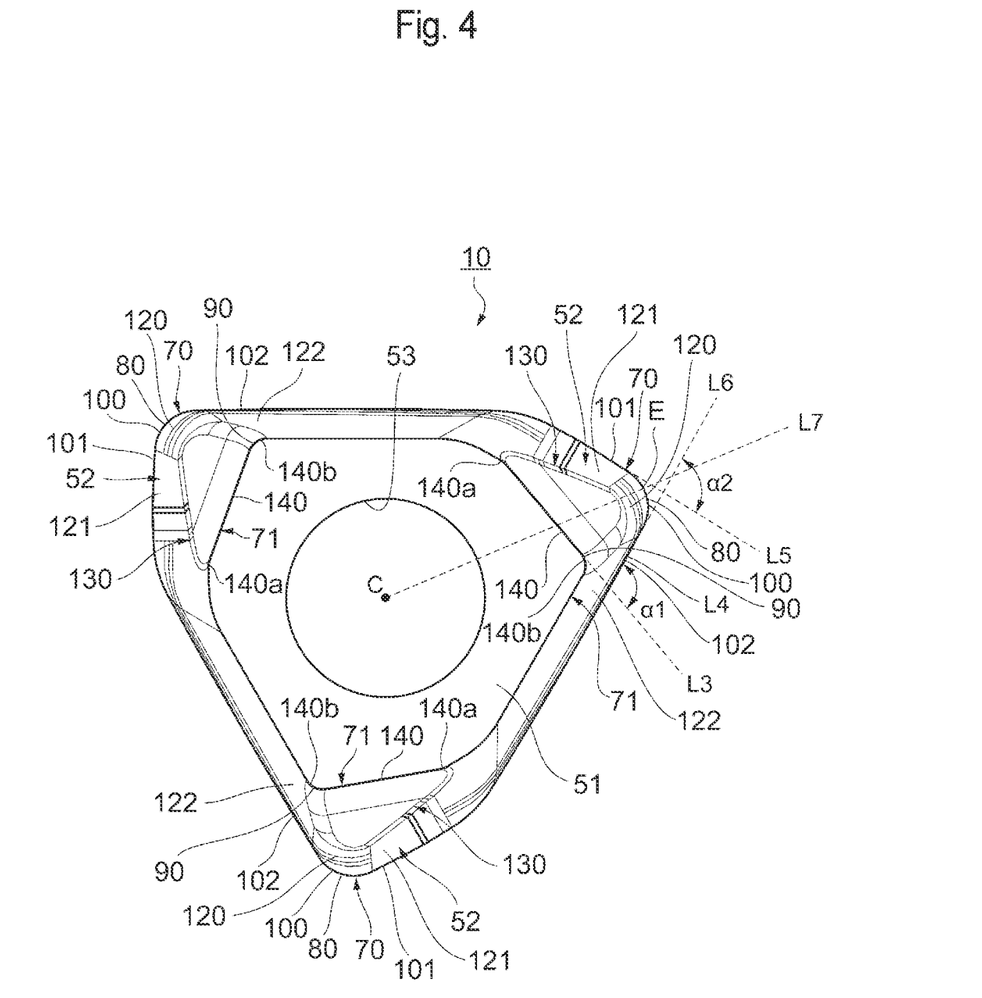
FIG. 4 is a bottom view of the cutting insert.
Figure 5:
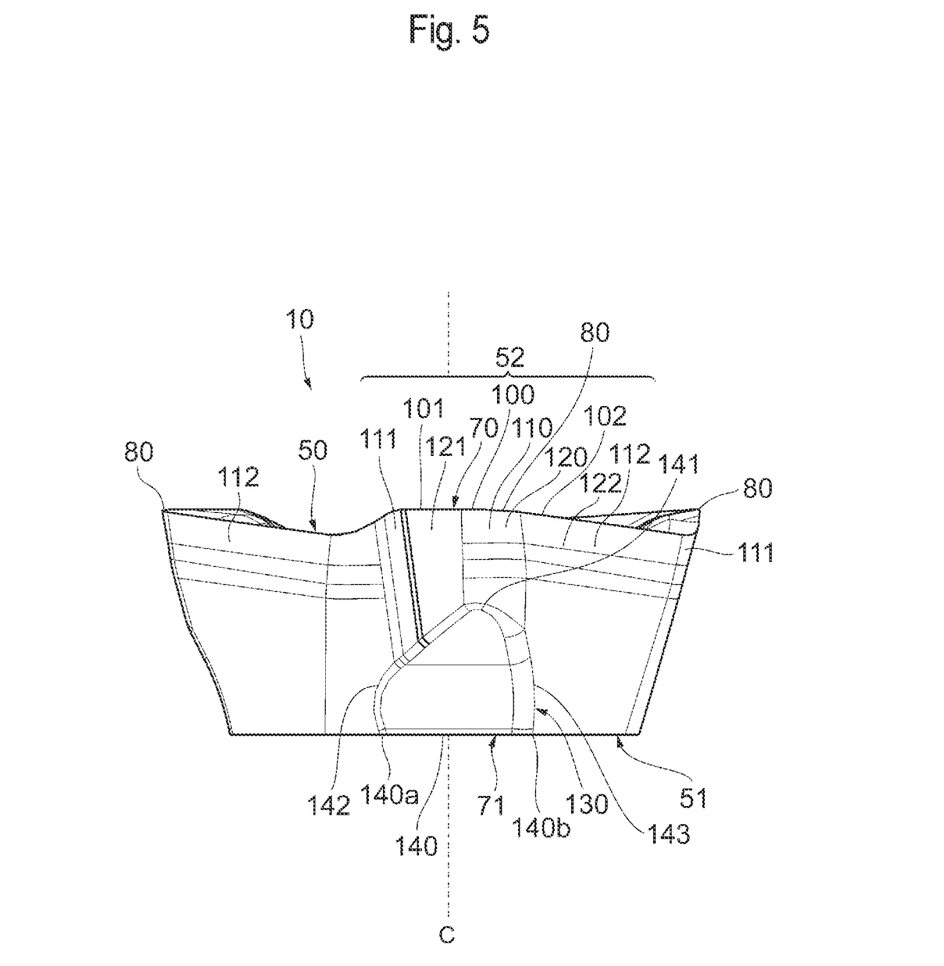
FIG. 5 is a side view of the cutting insert with a corner part facing the front.

As illustrated in FIG. 2, the cutting inserts 10 have, for example, a flat, substantially triangular prism shape. FIG. 3 is a top view of the cutting insert 10, and FIG. 4 is a bottom view of the cutting insert 10. FIG. 5 is a side view of the cutting insert 10.

As illustrated in FIG. 2, the cutting insert 10 includes upper and lower surfaces 50 and 51 facing each other and having a plurality of corner parts, three side surfaces 52 connecting the upper surface 50 and the lower surface 51 and forming intersecting edges 70 and 71 with the upper surface 50 and the lower surface 51 respectively, and a through hole 53 penetrating from the upper surface 50 to the lower surface 51.

As illustrated in FIG. 3, the upper surface 50 has, for example, a substantially triangular shape and includes three corner parts 80. The through hole 53 is provided at the center of the upper surface 50 and penetrates in the direction (vertical direction) from the upper surface 50 to the lower surface 51 (the front-back direction with respect to the page of FIG. 3). The through hole 53 includes a central axis C extending in the vertical direction.

As illustrated in FIG. 4, the lower surface 51 has, for example, a substantially triangular shape or substantially hexagonal shape and includes, for example, mainly three corner parts 90. The lower surface 51 is, for example, a flat surface. The central axis C of the through hole 53 is perpendicular to the lower surface 51. The lower surface 51 has an outer diameter smaller than that of the upper surface 50, and, in a bottom view, the sides of the contour of the lower surface 51 are positioned on the inner side (the central axis C side) than the sides of the contour of the upper surface 50. The intersecting edge 71 between the lower surface 51 and each side surface 52 is formed on the sides of the contour of the lower surface 51, and the intersecting edge 70 between the upper surface 50 and each side surface 52 is formed on the sides of the contour of the upper surface 50.

As illustrated in FIGS. 2, 3 and 4, the side surface 52 are composed of three surfaces corresponding to, for example, the three corner parts 80 of the upper surface 50.

For example, as illustrated in FIGS. 2 and 3, on the intersecting edge 70 between the upper surface 50 and each side surface 52 are formed a corner cutting edge 100 arranged at the position corresponding to the corresponding corner part 80 of the upper surface 50, a minor cutting edge 101 connected to a first end 100a of the corner cutting edge 100, and a major cutting edge 102 connected to a second end 100b of the corner cutting edge 100. The corner cutting edge 100 is curved in a substantially arc-shaped curve, wherein the section of the minor cutting edge 101 at the first end 100a side and the section of the major cutting edge 102 at the second end 100b side are at least linear.

As illustrated in FIG. 5, each side surface 52 includes a first side surface part 110 corresponding to the corner cutting edge 100, a second side surface part 111 corresponding to the minor cutting edge 101, and a third side surface part 112 corresponding to the major cutting edge 102, and forms the intersecting edge 70 with the upper surface 50 at each corner part 80. Between the side surfaces 52 adjacent to each other, the second side surface part 111 of one of the side surfaces 52 and the third side surface part 112 of the other side surface 52 are smoothly connected to each other.

The first side surface part 110 of each side surface 52 includes a flank 120 continuous with the corner cutting edge 100. The second side surface part 111 includes a flank 121 continuous with the minor cutting edge 101. The third side surface part 112 includes a flank 122 continuous with the major cutting edge 102. Each of the flanks 120, 121, and 122 is inclined so as to gradually recede toward the central axis C side, from the intersecting edge 70 toward the intersecting edge 71 of the lower surface 51. The flanks 120, 121, and 122 are formed halfway toward the lower surface 51 from the intersecting edge 70.

A recessed part 130 located on the lower surface 51 side of the flank 120 of the corner cutting edge 100 and the flank 121 of the minor cutting edge 101 is formed in each side surface 52. The recessed part 130 does not quite reach a lower part of, for example, the flank 122 of the major cutting edge 102; even if it does, it reaches at the minimum then disappears. The recessed part 130 may not be formed below, for example, the flank 122 of the major cutting edge 102.

The recessed part 130 has a curved shape that is recessed toward the central axis C of the through hole 53. In other words, from an upper end part of the recessed part 130 to a lower end part of the same, the recessed part 130 first recedes (becomes recessed) drastically toward the central axis C side (with a small radius of curvature), and then recedes (becomes recessed) gradually and slowly (with a large radius of curvature). The recessed part 130 extends from lower rims of the flanks 120 and 121 to reach the intersecting edge 71 of the lower surface 51.

An outer rim of the recessed part 130 is composed of, for example, a lower rim intersecting edge 140 which is a part of the intersecting edge 71 between the lower surface 51 and the side surface 52, a top rim part 141 formed at a lower end of the flank 120 of the corner cutting edge 100, a first lateral rim part 142 connected from the top rim part 141 to a first end 140a of the lower rim intersecting edge 140 of the recessed part 130, and a second lateral rim part 143 connected from the top rim part 141 to a second end 140b of the lower rim intersecting edge 140.

The top rim part 141 has, for example, an acute internal angle. The first lateral rim part 142 is located on the minor cutting edge 101 side with respect to the first side surface part 110 of the corner cutting edge 100, and the second lateral rim part 143 is located on the major cutting edge 102 side with respect to the first side surface part 110 of the corner cutting edge 100. The first lateral rim part 142 and the second lateral rim part 143 are each curved so as to protrude outward in a front view of the recessed part 130.

Figure 6:
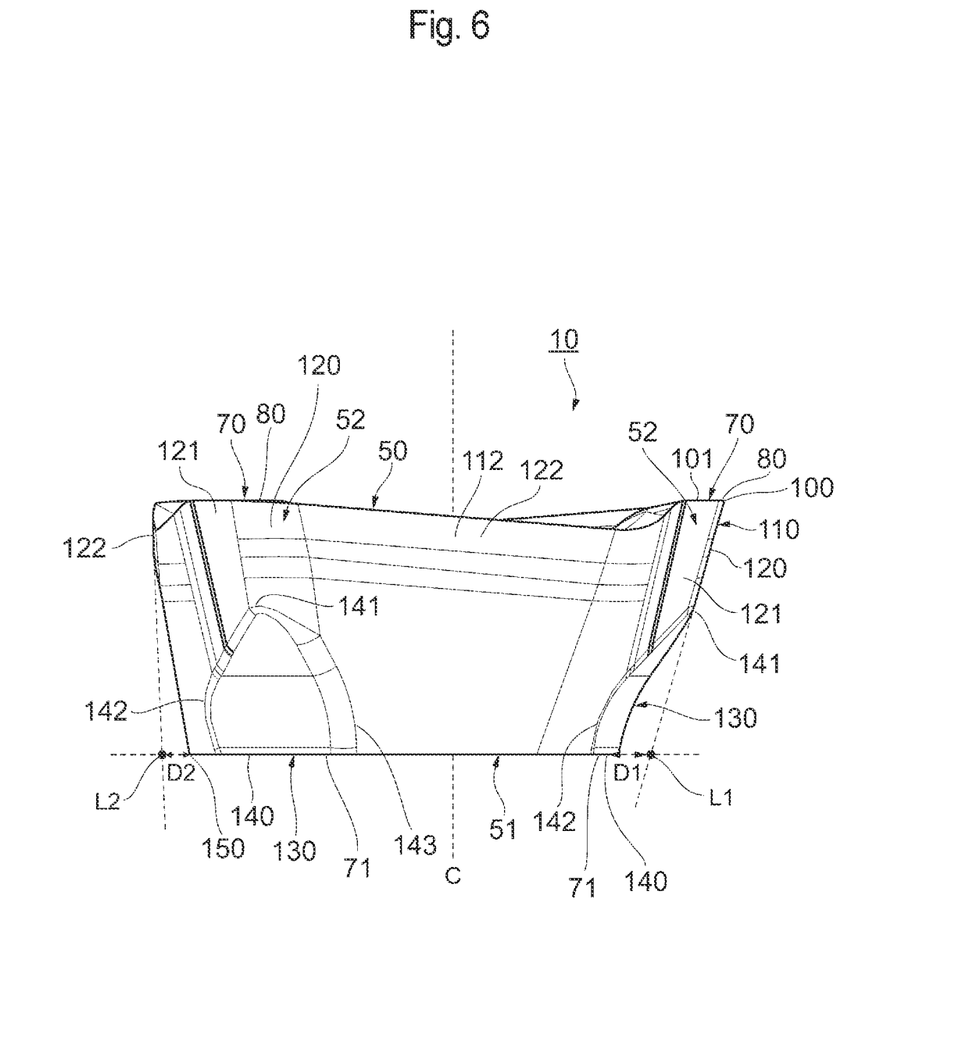
FIG. 6 is a side view of the cutting insert.
Figure 7:
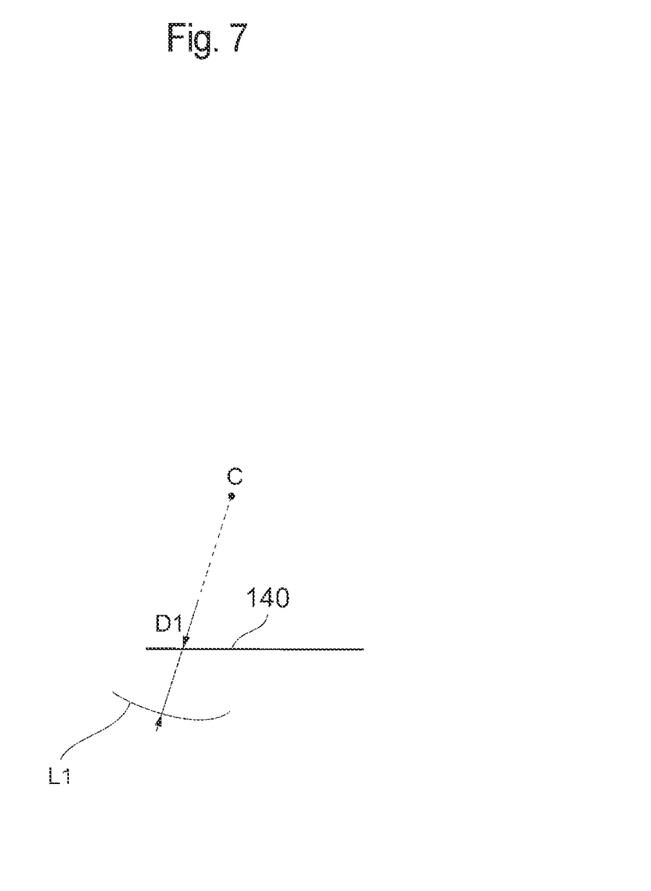
FIG. 7 is an explanatory diagram for explaining a first extended projection line.

The lower rim intersecting edge 140 is formed into, for example, a straight line. As shown in FIGS. 6 and 7, the lower rim intersecting edge 140 recedes toward the central axis C side of the through hole 53 from a first extended projection line L1 that is obtained by stretching the flank 120 of the corner cutting edge 100 toward the lower surface 51 side along the flank 120 and projecting the flank 120 on the same plane as the lower surface 51.

Figure 8:
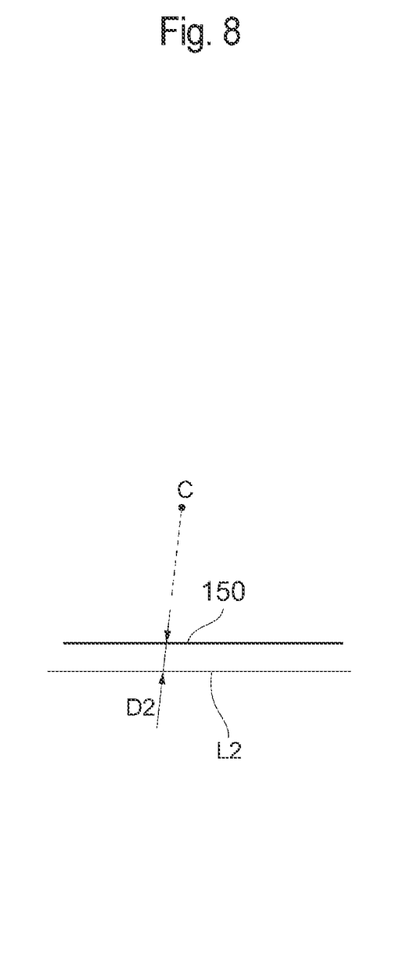
FIG. 8 is an explanatory diagram for explaining a second extended projection line.

Furthermore, the intersecting edge 71 between the side surface 52 and the lower surface 51 includes a first intersecting edge 150 located on the lower surface 51 side of the major cutting edge 102. As shown in FIGS. 6 and 8, the first intersecting edge 150 recedes toward the central axis C side of the through hole 53 from a second extended projection line L2 that is obtained by stretching the flank 122 of the major cutting edge 102 toward the lower surface 51 side along the flank 122 and projecting the flank 122 on the same plane as the lower surface 51. A maximum receding quantity D1 of the lower rim intersecting edge 140 of the recessed part 130 from the first extended projection line L1 is greater than a maximum receding quantity D2 of the first intersecting edge 150 from the second extended projection line L2. The receding quantity D1 is the distance from the first extended projection line L1 to the lower rim intersecting edge 140, on a line connecting an arbitrary point on the first extended projection line L1 and the central axis C, and the receding quantity D2 is the distance from the second extended projection line L2 to the first intersecting edge 150, on a line connecting an arbitrary point on the second extended projection line L2 and the central axis C. The maximum receding quantity D1 is greater than the maximum receding quantity D2 by 0.05 mm or more and 0.15 mm or less, preferably 0.08 mm or more and 0.12 mm or less. The maximum receding quantity D1 is 0.3 mm or more and 0.5 mm or less, or preferably 0.35 mm or more and 0.45 mm or less.

Also, in the bottom view shown in FIG. 4, a first internal angle α1 formed by a virtual extension line L3 obtained by stretching the lower rim intersecting edge 140 of the recessed part 130 toward the major cutting edge 102 and a virtual line L4 on the major cutting edge 102 is greater than a second internal angle α2 formed by a virtual extension line L5 obtained by stretching the minor cutting edge 101 toward the corner cutting edge 100 side and a virtual extension line L6 obtained by stretching the major cutting edge 102 toward the corner cutting edge 100 side. For example, the difference between the first internal angle α1 and the second internal angle α2 is, for example, 5° or more and 30° or less, preferably 10° or more and 25° or less, and more preferably 15° or more and 20° or less. Also, the first internal angle α1 is, for example, preferably 90° or more and 130° or less, preferably 100° or more and 120° or less, and more preferably 105° or more and 115° or less.

In the bottom view shown in FIG. 4, the first end 140a and the second end 140b of the lower rim intersecting edge 140 of the recessed part 130 are located so as to oppose each other with a virtual line L7 therebetween, the virtual line L7 passing through a peak E of the corner cutting edge 100 (the farthest point from the central axis C) and the central axis C of the through hole 53.

Figure 9:
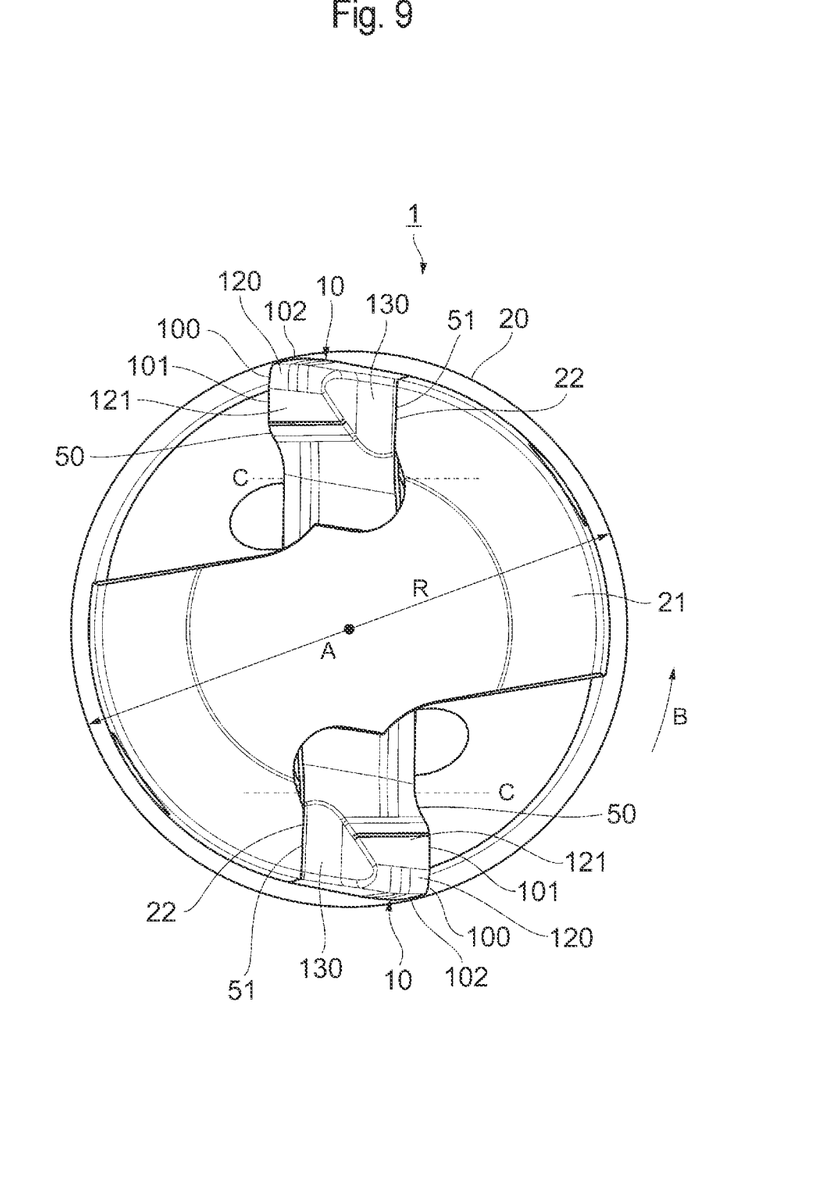
FIG. 9 is a diagram of the cutting tool viewed from the leading end side.

The cutting insert 10 is formed in such a manner that a size twice a maximum dimension M of the cutting insert 10 in the top view shown in FIG. 3 is greater than a tool diameter R of the tool body 20 of the cutting tool 1 to which the cutting insert 10 shown in FIG. 9 is fixed (M×2>R). Note that the position in the cutting insert 10 of the top view that has the maximum dimension M varies depending on the shape of the cutting insert 10. Moreover, as illustrated in FIG. 3, the maximum dimension M of the cutting insert 10 may be the maximum dimension in the direction perpendicular to the major cutting edge 102 with reference to the major cutting edge 102 in the top view.

Figure 10:
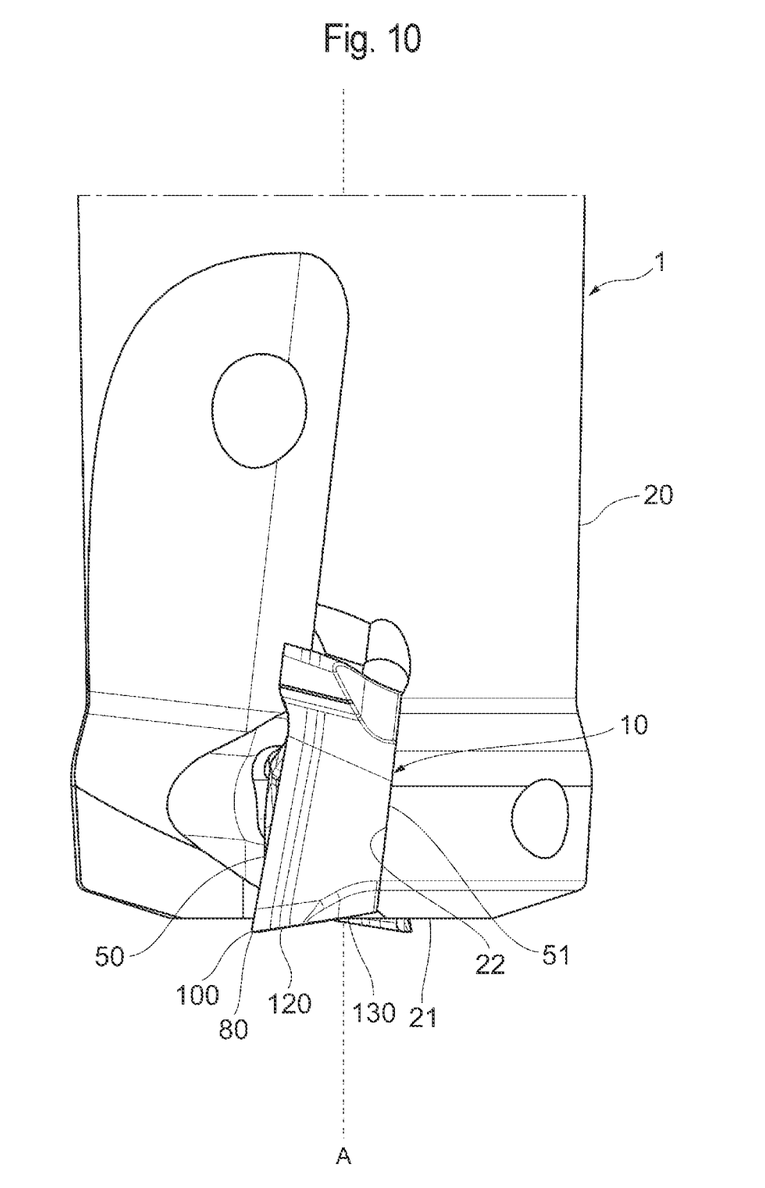
FIG. 10 is a diagram of the cutting tool viewed from the side.

As illustrated in FIG. 1, the cutting inserts 10 configured as described above are fixed to the fixing parts 22 of the tool body 20 of the cutting tool 1 by the screws 30. In so doing, the upper surfaces 50 of the cutting inserts 10 face the rotating direction B around the rotational axis A, and the corner parts 80 of the corner cutting edges 100 are located at a tool leading end. Furthermore, as illustrated in FIGS. 1 and 10, the recessed part 130 is continuous with the flat leading end end surface 21 of the tool body 20 without a significant step.

Figure 11:
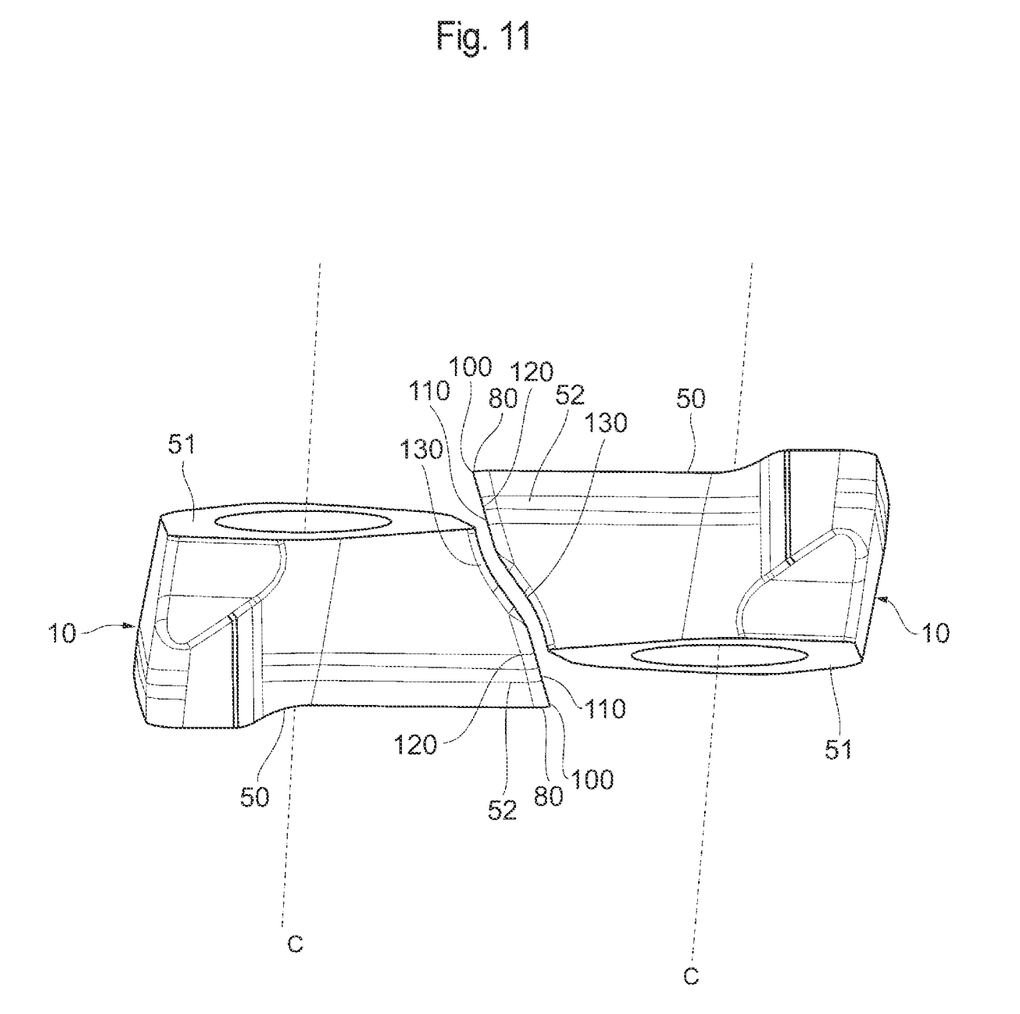
FIG. 11 is an explanatory diagram illustrating a positional relationship between two cutting inserts of the cutting tool.

As illustrated in FIG. 9, two cutting inserts 10 are fixed to the tool body 20 of the cutting tool 1. The two cutting inserts 10 are fixed at positions that are 180° apart around the rotational axis A so as to be point-symmetrical to the rotational axis A. In so doing, as illustrated in FIG. 11, while the two cutting inserts 10 are oriented upside down, the first side surface parts 110 thereof having the corner cutting edges 100 are brought close to each other, and the recessed part 130 of one of the cutting inserts 10 faces the flank 120 of the other cutting insert 10, so the bumps and dips of the cutting inserts 10 fit into each other. As a result, the two cutting inserts 10 are fixed in a state of being close to each other.

According to the present embodiment, the side surfaces 52 of each cutting insert 10 are each formed with the flank 120 of the corner cutting edge 100 and the recessed part 130 located on the lower surface 51 side of the flank 120 of the corner cutting edge 100. Therefore, for example, as illustrated in FIG. 11, the plurality of cutting inserts 10 can be fixed to the tool body 20 in a state of being closer to each other so as not to interfere with each other. As a result, the tool diameter R can be reduced to downsize the cutting tool 1.

In addition, since the recessed part 130 is provided on the lower surface 51 side of the flank 120, when using the cutting inserts 10 mounted on the tool body 20, chips from the work material can be prevented from entering between the work material and the cutting tool 1.

The recessed part 130 is formed so as to extend to a position on the lower surface 51 side of the flank 121 of the minor cutting edge 101. As a result, the space created by the recessed part 130 expands, so that the plurality of cutting inserts 10 fixed to the tool body 20 can be brought closer to each other without interfering with each other, thereby downsizing the cutting tool 1. Also, the chips are further prevented from entering between the work material and the cutting tool 1.

As illustrated in FIG. 6, the lower rim intersecting edge 140 of the recessed part 130 recedes toward the central axis C side of the through hole 53 from the first extended projection line L1 that is obtained by stretching the flank 120 of the corner cutting edge 100 toward the lower surface 51 side along the flank 120 and projecting the flank 120 on the same plane as the lower surface 51. As a result, a sufficient space can be secured on the lower surface 51 side of the flank 120 by the recessed part 130.

As illustrated in FIG. 6, the maximum receding quantity D1 of the lower rim intersecting edge 140 of the recessed part 130 from the first extended projection line L1 is greater than the maximum receding quantity D2 of the first intersecting edge 150 of the major cutting edge 102 from the second extended projection line L2. Therefore, a sufficient space can be secured on the lower surface 51 side of the flank 120 by the recessed part 130. Also, since the receding quantity of the first intersecting edge 150 is relatively small, the area of the lower surface 51 (the area of the fixed surface) is secured, whereby the cutting inserts 10 can be firmly fixed to the tool body 20.

In the bottom view shown in FIG. 4, the first internal angle α1 formed by the virtual extension line L3 obtained by stretching the lower rim intersecting edge 140 of the recessed part 130 toward the major cutting edge 102 and the virtual line L4 on the major cutting edge 102 is greater than the second internal angle α2 formed by the virtual extension line L5 obtained by stretching the minor cutting edge 101 toward the corner cutting edge 100 side and the virtual extension line L6 obtained by stretching the major cutting edge 102 to the corner cutting edge 100 side. Thus, the receding quantity of the lower rim intersecting edge 140 of the recessed part 130 from the intersecting edge 70 of the upper surface 50 increases toward the major cutting edge 102. Also, the chips are further prevented from entering between the work material and the cutting tool 1.

In the bottom view shown in FIG. 4, the first end 140a and the second end 140b of the lower rim intersecting edge 140 of the recessed part 130 are positioned so as to oppose each other with the virtual line L7 therebetween, the virtual line L7 passing through the peak E of the corner cutting edge 100 and the central axis C of the through hole 53. As a result, a sufficient space can be secured on the lower surface 51 side of the flank 120 by the recessed part 130.

The outer rim of the recessed part 130 includes the top rim part 141, the first lateral rim part 142, and the second lateral rim part 143. Thus, the recessed part 130 can be formed in an appropriate range, and the strength of the cutting insert 10 can be maintained.

The recessed part 130 has a curved shape that is recessed toward the central axis C of the through hole 53. Therefore, while securing a sufficient space on the lower surface 51 side of the flank 120 by the recessed part 130, the decrease in the area of the lower surface 51 can be suppressed, and the cutting insert 10 can be firmly fixed to the tool body 20. Also, the chips can be further prevented from entering between the work material and the cutting tool 1.

In the top view, the size twice the maximum dimension M of the cutting insert 10 is greater than the tool diameter R of the tool body 20 of the cutting tool 1 to which the cutting insert 10 is fixed. As a result, since the tool diameter R of the cutting tool 1 can be made small in order to, for example, mount the cutting insert 10 having the same dimension as the conventional one, the cutting tool 1 can be downsized.

Although a preferred embodiment of the present invention has been described above with reference to the accompanying drawings, the present invention is not limited to the embodiment. It is obvious that a person skilled in the art can come up with various modifications or corrections within the scope of the ideas described in the claims, and it is understood that such modifications and corrections naturally belong to the technical scope of the present invention.

For example, the configuration of the cutting insert 10 is not limited to that of the foregoing embodiment. For example, the recessed part 130 may not be located on the lower surface 51 side of the flank 121 of the minor cutting edge 101, but may be located only on the lower surface 51 side of the flank 120 of the corner cutting edge 100. Also, the boundary of the recessed part 130 at the major cutting edge 102 side may slightly reach the flank 122 side. For example, the boundary of the recessed part 130 at the major cutting edge 102 side may protrude toward the major cutting edge 102 side by, for example, approximately 1.5 mm or less with respect to the boundary between the flank 120 of the corner cutting edge 100 and the flank 122 of the major cutting edge 102. The shape of the outer rim of the recessed part 130 is not limited to the one described in the foregoing embodiment.

The shape of the cutting insert 10 is not limited to the substantially triangular shape, and may be a shape with a plurality of corner parts, such as a pentagonal shape, a hexagonal shape, and an octagonal shape. The shapes, numbers, and dimensions of the corner cutting edge 100, the minor cutting edge 101, and the major cutting edge 102 are not limited to the ones described in the foregoing embodiment.

The applications of the cutting tool 1 described in the present embodiment are not particularly limited, and the cutting tool 1 can be applied to uses other than shoulder milling. Further, the cutting tool 1 may be an end mill, a milling cutter, a drill, or the like.

The present invention is useful in providing a cutting insert configured to be able to realize downsizing of a cutting tool, and the cutting tool.

What is claimed is:
1. A cutting insert, comprising:
an upper surface and a lower surface away from each other and having a plurality of corner parts;
a side surface connecting the upper surface and the lower surface and forming intersecting edges with the upper surface and the lower surface, respectively; and
a through hole that has a central axis extending from the upper surface to the lower surface and that is formed for penetration from the upper surface to the lower surface, wherein
a corner cutting edge arranged at a position corresponding to a corner part of the upper surface, a minor cutting edge connected to a first end of the corner cutting edge, and a major cutting edge connected to a second end of the corner cutting edge are formed on the intersecting edge between the upper surface and the side surface,
a flank of the corner cutting edge and a recessed part are formed on the side surface, the recessed part being located between the lower surface and the flank of the corner cutting edge,
an outer rim of the recessed part includes a lower rim intersecting edge between the lower surface and the side surface,
the lower rim intersecting edge of the recessed part recedes toward the central axis of the through hole from a first extended projection line obtained by stretching the flank of the corner cutting edge toward the lower surface along the flank of the corner cutting edge and projecting the flank of the corner cutting edge on the same plane as the lower surface,
a flank of the major cutting edge is formed on the side surface,
a first intersecting edge that is between the side surface and the lower surface and that is located between the lower surface and the major cutting edge recedes toward the central axis of the through hole from a second extended projection line obtained by stretching the flank of the major cutting edge toward the lower surface along the flank of the major cutting edge and projecting the flank of the major cutting edge on the same plane as the lower surface, and a maximum receding quantity of the lower rim intersecting edge of the recessed part from the first extended projection line is greater than a maximum receding quantity of the first intersecting edge from the second extended projection line.

2. The cutting insert according to claim 1, wherein a flank of the minor cutting edge is formed on the side surface, and the recessed part is formed so as to extend to a position between the lower surface and the flank of the minor cutting edge.

3. The cutting insert according to claim 1, wherein, in a bottom view, a first internal angle that is formed by a virtual extension line obtained by stretching the lower rim intersecting edge of the recessed part toward the major cutting edge and a virtual line on the major cutting edge is greater than a second internal angle that is formed by a virtual extension line obtained stretching the minor cutting edge toward the corner cutting edge and a virtual extension line obtained by stretching the major cutting edge toward the corner cutting edge.

4. The cutting insert according to claim 1, wherein, in the bottom view, a first end and a second end of the lower rim intersecting edge of the recessed part are positioned so as to oppose each other with a virtual line therebetween, the virtual line passing through a peak of the corner cutting edge and the central axis of the through hole.

5. The cutting insert according to claim 1, wherein the outer rim of the recessed part includes a top rim part formed at a lower end of the flank of the corner cutting edge, a first lateral rim part connected from the top rim part to the first end of the lower rim intersecting edge, and a second lateral rim part connected from the top rim part to the second end of the lower rim intersecting edge.

6. The cutting insert according to claim 1, wherein the recessed part has a curved shape that is recessed toward the central axis of the through hole.

7. The cutting insert according to claim 1, wherein the cutting insert is configured to be fixed to a tool body of a cutting tool, and when viewed in a direction of the central axis of the through hole, a size twice a maximum length of the cutting insert is greater than a tool diameter of the tool body of the cutting tool to which the cutting insert is fixed.

8. A cutting tool, comprising:

the cutting insert described in claim 1; and a tool body to which the cutting insert is fixed.

9. A cutting insert, comprising:

an upper surface and a lower surface facing each other and having a plurality of corner parts;

a side surface connecting the upper surface and the lower surface and forming intersecting edges with the upper surface and the lower surface, respectively; and a through hole that has a central axis extending from the upper surface to the lower surface and that is formed for penetration from the upper surface to the lower surface, wherein a corner cutting edge arranged at a position corresponding to a corner part of the upper surface, a minor cutting edge connected to a first end of the corner cutting edge, and a major cutting edge connected to a second end of the corner cutting edge are formed on the intersecting edge between the upper surface and the side surface, a flank of the corner cutting edge and a recessed part are formed on the side surface, the recessed part being located between the lower surface and the flank of the corner cutting edge, an outer rim of the recessed part includes a lower rim intersecting edge between the lower surface and the side surface, the lower rim intersecting edge of the recessed part recedes toward the central axis of the through hole from a first extended projection line obtained by stretching the flank of the corner cutting edge toward the lower surface along the flank of the corner cutting edge and projecting the flank of the corner cutting edge on the same plane as the lower surface, in a bottom view, a first internal angle that is formed by a virtual extension line obtained by stretching the lower rim intersecting edge of the recessed part toward the major cutting edge and a virtual line on the major cutting edge is greater than a second internal angle that is formed by a virtual extension line obtained stretching the minor cutting edge toward the corner cutting edge and a virtual extension line obtained by stretching the major cutting edge toward the corner cutting edge.

10. The cutting tool according to claim 8, wherein, when viewed in a direction of the central axis of the through hole, a size twice a maximum length of the cutting insert is greater than a tool diameter of the tool body of the cutting tool to which the cutting insert is fixed.

* * * * *